(12) United States Patent
McIntosh et al.

(10) Patent No.: US 6,530,616 B1
(45) Date of Patent: Mar. 11, 2003

(54) CONTINUITY SWITCH FOR PARTS GRIPPERS

(75) Inventors: Bruce D. McIntosh, Monroeville, IN (US); Kenneth A. Steele, Fort Wayne, IN (US)

(73) Assignee: PHD, Inc., Wayne, IN (US)

( * ) Notice: Subject to any disclaimer, the term of this patent is extended or adjusted under 35 U.S.C. 154(b) by 0 days.

(21) Appl. No.: 09/875,656

(22) Filed: Jun. 6, 2001

Related U.S. Application Data

(60) Provisional application No. 60/214,079, filed on Jun. 27, 2000.

(51) Int. Cl.[7] .............................. B25J 15/08; B25J 19/02
(52) U.S. Cl. ......................... 294/106; 294/88; 294/116; 294/907; 901/37; 901/46
(58) Field of Search ....................... 294/86.4, 88, 106, 294/115, 116, 902, 907; 269/32, 34; 318/568.16, 568.17, 568.21; 414/729, 730, 739, 751.1, 753.1, 226.02; 901/31, 36–39, 46

(56) References Cited

U.S. PATENT DOCUMENTS

| | | | | |
|---|---|---|---|---|
| 4,600,357 A | * | 7/1986 | Coules | 294/907 X |
| 4,730,861 A | * | 3/1988 | Spencer | 294/907 X |
| 4,752,094 A | * | 6/1988 | Tabeau | 294/907 X |
| 4,906,926 A | * | 3/1990 | Rogacki et al. | 294/907 X |
| 5,040,836 A | * | 8/1991 | Roudaut | 294/116 X |
| 5,062,673 A | * | 11/1991 | Mimura | 294/907 X |
| 5,383,697 A | * | 1/1995 | Roudaut | 294/907 X |
| 5,437,490 A | * | 8/1995 | Mimura et al. | 294/907 X |
| 6,048,013 A | * | 4/2000 | Moilanen et al. | 294/116 X |

* cited by examiner

Primary Examiner—Johnny D. Cherry
(74) Attorney, Agent, or Firm—Barnes & Thornburg

(57) ABSTRACT

A parts gripper having a continuity switch to determine the presence of a part or workpiece held between the jaws of a parts gripper comprising a parts gripper having a yoke, a pair of jaw members, a pivot pin, a cover plate, a side impact plate, and an electrical lead conductively connected to the first attachment portion of the pivot pin. The pivot pin is conductively connected to the jaw members and connects the jaw members to the yoke of the gripper body. The pivot pin includes a shaft, a neck portion, a stepped portion, and a first attachment portion. The shaft connects the jaw members to the yoke. The cover plate has a keyed through-hole for mating with the neck portion of the pivot pin. The side impact plate has a slot for mating with the stepped portion of the pivot pin to prevent the pivot pin from rotating.

20 Claims, 5 Drawing Sheets

CONTINUITY SWITCH FOR PARTS GRIPPERS

RELATED APPLICATION

This application is based upon U.S. Provisional Application Serial No. 60/214,079, filed Jun. 27, 2000, the complete disclosure of which is hereby expressly incorporated by reference.

TECHNICAL FIELD

The present invention relates to fluid pressure actuated grippers of the type employed in automated workpiece handling devices which clampingly grip and transfer workpieces from one station to another. More particularly, the present invention relates to a continuity switch assembly for fluid pressure actuated grippers.

BACKGROUND ART

Fluid pressure actuated grippers are widely employed and typically take the form of a pneumatic or hydraulic differential motor whose cylinder is fixedly mounted to a transfer device. At the forward or rod end of the cylinder housing, a gripper jaw mounting structure is fixedly mounted on the cylinder to pivotally support a pair of opposed gripper jaws which are coupled to the piston rod of the motor by a linkage so arranged that, upon movement of the piston in one direction, the jaws are pivoted to an open position, and upon movement of the piston in the opposite direction, the jaws are driven to a closed workpiece gripping position.

In typical operation, the gripper jaws will be closed upon a workpiece near the edge of the workpiece, and the gripper will be advanced to position the gripped workpiece in operative relationship with a work station. The gripper will then be opened to release the workpiece, and the transfer device will retract the gripper from the work station while the work operation is performed. At the conclusion of the work operation, the gripper will then advance back into the work station, and the jaws will again close upon the workpiece and carry it away from the work station. Opening and closing the gripper jaws thus takes place when the gripper is in its closest proximity to tooling at the work station.

There are basically two types of linkage arrangements used in fluid pressure actuated grippers to connect the gripper jaws to the piston rods and effect movement of the gripper jaws. These are pivotable link arrangements and pivotal cam arrangements. An example of a pivotal link arrangement can be found in U.S. Pat. No. 5,152,568 to Blatt, which discloses pivotal links 36 and 40 that cooperate with gripper jaws 12A and 12B, as shown in FIG. 3.

U.S. Pat. No. 4,518,187 to Blatt, et al. discloses a pivotal cam arrangement in which jaw plates 45 and 47 are pivoted by the cooperation of cam slots 61 provided in the jaw plates and a pivot pin 37 (and rollers 39) attached to the piston rod.

In a typical production line, there are numerous work stations with one or more fluid pressure actuated gripper devices positioned between adjacent work stations. During operation, all of the gripper devices are synchronized so that they simultaneously remove a workpiece from one work station and transfer the workpiece to the next work station. In such an operation, a problem can occur if any one of the gripper devices fails to properly grip a workpiece. For example, if a workpiece slips from its initial gripped position, it can become sufficiently out of alignment to prevent its transfer to a succeeding gripper device. A more serious problem can occur if a workpiece is transferred in a misaligned manner and, subsequently, positioned at a work station in a misaligned fashion. Such an incident can damage the work station. Another problem which can occur is completely losing grip of a workpiece and dropping the workpiece. Losing grip of a workpiece can occur when there is a leak or failure of fluid pressure supplied to the piston rod actuator.

SUMMARY

The present invention provides a continuity switch for parts grippers that can be used to determine the presence of a part or workpiece held between the jaws of a parts gripper.

One embodiment of the present invention provides a parts gripper comprising a gripper body having a yoke, a pair of jaw members, a pivot pin, and an electrical lead conductively connected to the pivot pin. The pivot pin has a shaft conductively connected to the jaw members and connects the jaw members to the yoke of the gripper body.

In one embodiment of the parts gripper, the pivot pin includes a neck portion having a radius smaller than the radius of the shaft.

In another embodiment of the parts gripper, the parts gripper further includes a cover plate. The cover plate has a keyed through-hole for mating with the neck of the pivot pin.

In yet another embodiment of the parts gripper, the keyed through-hole includes a first portion with a first radius and a second portion with a second radius. The first radius is greater than the radius of the shaft, and the second radius is greater than the radius of the neck portion and less than the radius of the shaft portion.

In still another embodiment of the parts gripper, the pivot pin includes a stepped portion with a width greater than the width of the shaft.

In another embodiment of the parts gripper, the gripper further comprises a side impact plate having a slot for mating with the stepped portion of the pivot pin to prevent the pivot pin from rotating.

In yet another embodiment of the parts gripper, the width of the stepped portion of the pivot pin is approximately equal to the width of the slot of the side impact plate.

In still another embodiment of the parts gripper, the pivot pin includes an attachment portion for connecting the electronic lead.

In yet another embodiment of the parts gripper, the attachment portion of the pivot pin is threaded and includes a threaded nut to connect the electrical lead thereon.

A second embodiment of the present invention provides a parts gripper comprising a parts gripper body having a yoke, a pair of jaw members, a pivot pin, a cover plate, a side impact plate, and an electrical lead conductively connected to the first attachment portion of the pivot pin. The pivot pin is conductively connected to the jaw members and connects the jaw members to the yoke of the gripper body. The pivot pin includes a shaft, a neck portion, a stepped portion, and a first attachment portion. The shaft connects the jaw members to the yoke. The cover plate has a keyed through-hole for mating with the neck portion of the pivot pin. The side impact plate has a slot for mating with the stepped portion of the pivot pin to prevent the pivot pin from rotating.

In one embodiment of the parts gripper, the keyed through-hole includes a first portion with a first radius and a second portion with a second radius, the first radius being greater than the second radius.

In another embodiment of the parts gripper, the neck portion of the pivot pin has a radius smaller than the radius of the shaft of the pivot pin.

In yet another embodiment of the parts gripper, the width of the stepped portion of the pivot pin is approximately equal to the width of the slot of the side impact plate.

In still another embodiment of the parts gripper, the stepped portion of the pivot pin includes at least one flat side.

In yet another embodiment of the parts gripper, the side impact plate includes at least one leg.

In another embodiment of the parts gripper, the pivot pin includes a second attachment portion disposed opposite the first attachment portion.

In yet another embodiment of the parts gripper, the first attachment point is threaded and includes a threaded nut to connect the electrical lead thereon.

A third embodiment of the present invention provides a work station for positioning a workpiece. The work station comprises a pair of parts grippers, a continuity detector, a first electrical lead, and a second electrical lead. Each of the parts grippers has a pair of jaw members for grabbing the workpiece and a pivot pin having a shaft conductively connected to the jaw members. The continuity detector has a pair of inputs for determining the presence of the workpiece between the jaw members of the parts grippers. The first electrical lead connects the pivot pin of one of the parts grippers to one of the inputs of the continuity detector. The second electrical lead connects the pivot pin of the other parts gripper to the other input of the continuity detector.

In another embodiment of the work station, each pivot pin includes a neck portion, a stepped portion, and an attachment portion. The radius of the neck portion is less than the radius of the neck portion, and the width of the stepped portion is greater than the width of the shaft.

In yet another embodiment of the work station, each parts gripper includes a cover plate and a side impact plate. The cover plate includes a keyed through-hole that mates with the neck portion of the pivot pin. The side impact plate includes a slot that mates with the stepped portion of the pivot pin.

BRIEF DESCRIPTION OF DRAWINGS

The present invention will be described hereafter with reference to the attached drawings which are given as non-limiting examples only, in which.

Other objects, advantages and novel features of the present invention will become apparent from the following detailed description of the invention when considered in conjunction with the accompanying drawings.

DESCRIPTION OF THE INVENTION

The present invention is directed to continuity switch assemblies for fluid pressure actuated grippers of the type employed in automated workpiece handling devices which clampingly grip and transfer workpieces from one station to another. Such gripper devices include pneumatic or hydraulic differential motors that drive a piston rod in a reciprocal fashion, and a pair of jaws which are attached to the piston rod by a mechanical linkage that effects opening and closing of the jaws as the piston rod undergoes reciprocal motion.

Figure 1:
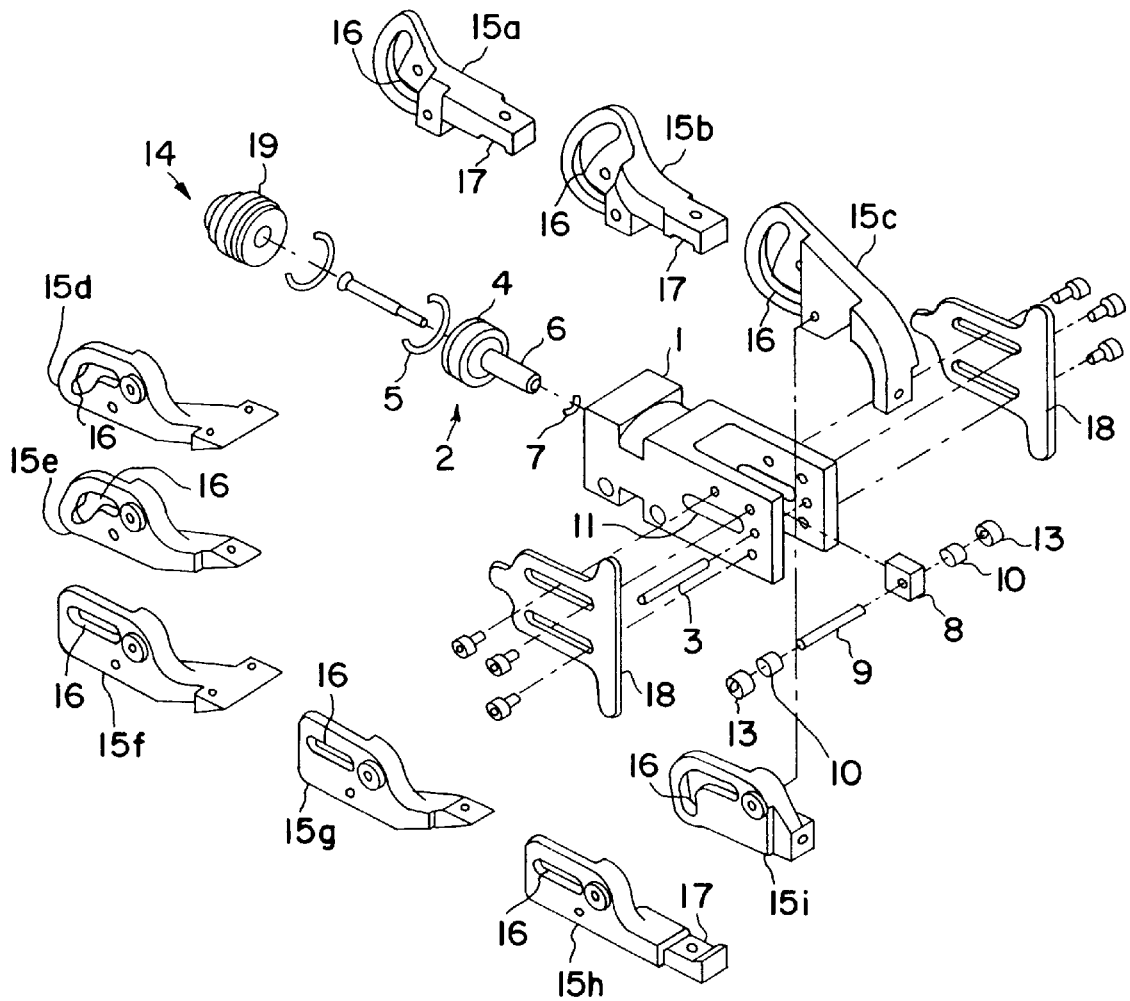
FIG. 1 is an exploded prospective view which depicts components of a conventional modular gripper.

FIG. 1 is an exploded view which depicts the components of a conventional modular gripper. This modular gripper includes body 1, a piston assembly 2, jaw pivot pin 3, and a jaw driver assembly 14. The piston assembly 2 includes piston 4, piston seal 5, piston shaft 6, and piston shaft seal 7. The jaw driver assembly includes cross piece 8 which is attached to piston shaft 6, cam pin 9 which is coupled to cross piece 8, jaw bushings 10 which are received in cam slots 16 of the jaw members 15, and slider bushings 13 which are received in longitudinal slots 11 formed in the side walls of the yoke structure of the body 1.

FIG. 1 depicts a number of different interchangeable gripper jaw members 15a to 15i which can be assembled in the body 1 and coupled to the jaw driver assembly. As depicted, each of the different jaw members 15a to 15i have different tip end designs and/or cam slots 16 that effect different movement characteristics.

Jaw 15a includes a recessed tip seat 17 and is designed to open either 22.5° or 45° from a closed position. Jaw 15b includes a recessed tip seat 17 and is designed to open 75° from a closed position. Jaw 15c includes a tip seat which can be recessed and is designed to open 55° from a closed position. Jaw 15d includes a double chisel point and is designed to open 22.5° from a closed position. The chisel point includes a bore for receiving a cone point or cone gripper tip. Jaw 15e is similar to jaw 15d, except jaw 15e includes a single chisel point. Jaw 15f includes a double chisel point and is designed to remain stationary. Jaw 15g is similar to jaw 15e, except jaw 15g includes a single chisel point. Jaw 15h includes a recessed tip seat 17 and is designed to remain stationary. Jaw 15i is a flange jaw and includes a tip seat at the end thereof. Jaw 15i is designed to open 22.5° from a closed position. Jaws 15a–15i are examples of different gripper jaw designs which can be used in various combinations. As will be understood from the following description, the shape and configuration of the slots in the jaws can be varied to effect a desired movement of the jaws, including angular degree of opening and closing, rate of opening and closing and force applied to a workpiece in the closed position. The dimensions depicted throughout the figures are relative and can be scaled up or down as desired.

The side impact plates 18 depicted in FIG. 1 are both adjustable and interchangeable with other side impact plate designs. In addition, the end closure or plug 19 for the pneumatic or hydraulic cylinder is interchangeable with plugs 19 of different lengths which can be used to limit the travel of the piston assembly and, hence, the angular movement of the gripper jaw members 15a–15i. The continuity switch assembly of the present invention can be used in conjunction with the modular gripper of FIG. 1 or any parts gripper having a pivot pin which can be modified to attach an electrical lead on an end thereof.

The concept of utilizing continuity for determining the presence or absence of a part in a workpiece holder is particularly suitable for metallic workpieces. The present inventors have determined that there are several considerations in designing continuity switch assemblies for parts grippers. In the case of fluid pressure actuated grippers of the type employed in automated workpiece handling devices, there are numerous parts, many of which move with respect to other parts. The present invention provides a continuity switch assembly that utilizes a pivot pin that remains stationary relative to the body of parts grippers, and which pivot pin is directly in physical contact with the jaw members of the parts grippers. The present invention involves modification of the pivot pin of a parts gripper so that an electrical lead can be attached to an end thereof.

Figure 2:
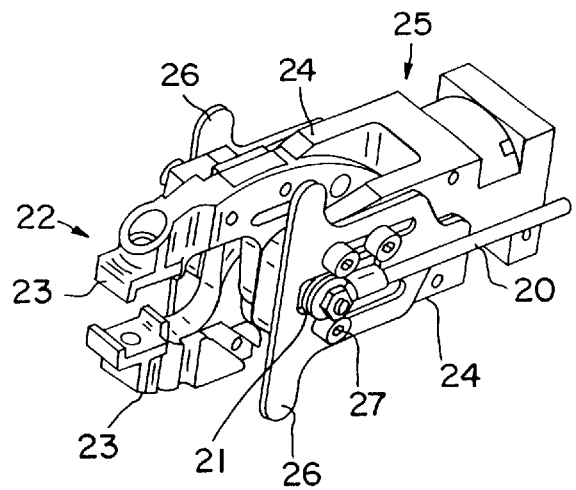
FIG. 2 is a prospective view of a modular gripper having a continuity switch assembly coupled thereto according to one embodiment of the present invention.

FIG. 2 is a prospective view of a modular gripper having a continuity switch assembly attached thereto, according to one embodiment of the present invention. The continuity switch assembly of the present invention allows an electrical lead 20 to be connected to an end of a pivot pin 21 of a parts gripper 22. As can be understood from FIG. 1, the pivot pin is inserted through the jaw members 23 with the ends thereof normally inserted into the walls 24 of the yoke structure of the body 25. In the case of the conventional parts gripper depicted in FIG. 1, the side impact plates 26 are used to hold the pivot pin 21 in position.

Figure 7:
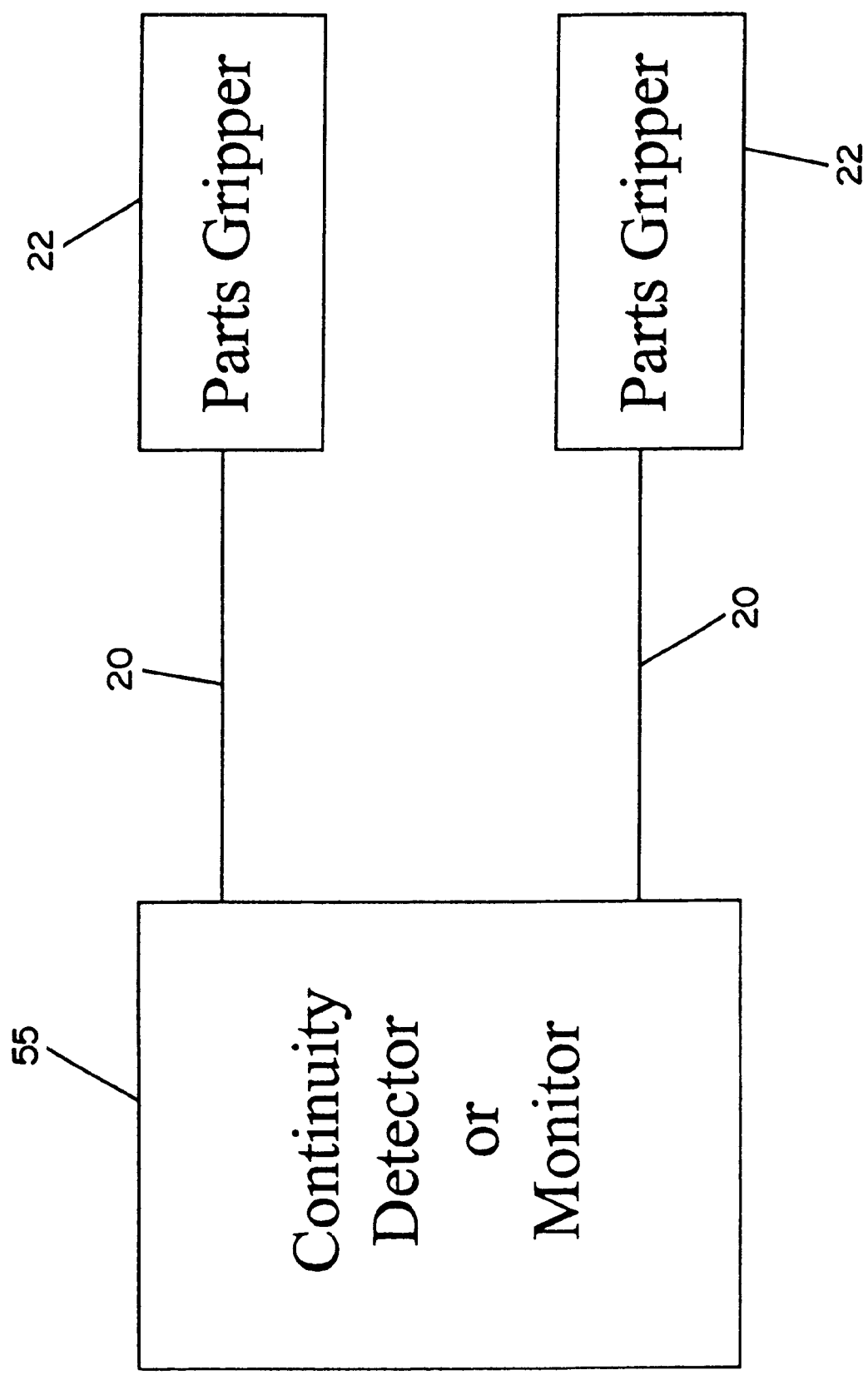
FIG. 7 is a block diagram of a continuity detection scheme according to one embodiment of the present invention.

In the embodiment of continuity switch assembly of the present invention depicted in FIG. 2, one end of the pivot pin 21 is threaded and extends through side impact plate 26 so that the electrical lead 20 can be coupled thereto and secured by threaded nut 27. The electrical lead 20 thus extends toward the rear of the parts gripper 22 and to a conventional electrical continuity detector or monitor 55 (FIG. 7). Continuity can be detected by using two parts grippers, each having a continuity switch according to the present invention. When pairs of such parts grippers are used in conjunction with parts or workpieces that are electrically conductive, such as metal parts or workpieces, continuity between the parts grippers and through the parts or workpieces can be monitored to determine the presence or absence of a part or workpiece.

Figure 3:
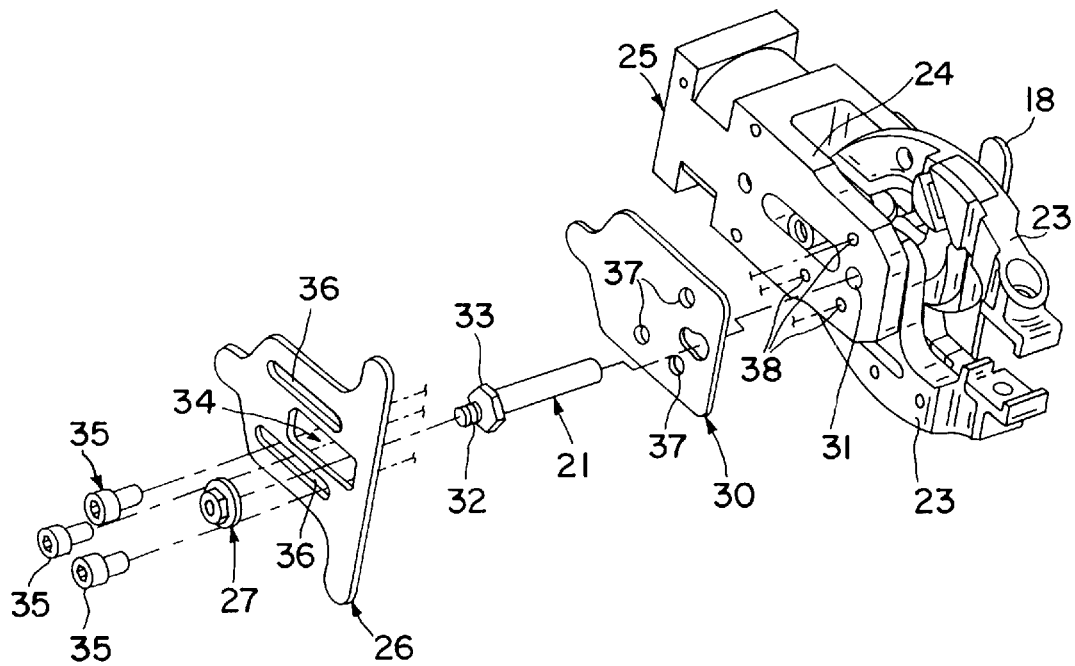
FIG. 3 is an exploded prospective view of one side of a modular gripper according to the present invention which depicts various elements of the continuity switch assembly.

FIG. 3 is an exploded prospective view of one side of a modular gripper, according to the present invention, which depicts various elements of the continuity switch assembly. As discussed above, the continuity switch assemblies of the present invention include a pivot pin 21, having an end that is configured to have an electrical lead attached thereto. The continuity switch assembly further includes a cover plate 30 which is used to hold the pivot pin 21 in position in through-hole 31 that is provided in the wall 24 of the yoke structure of the body 25.

The threaded end 32 of the pivot pin 21 includes stepped portion 33 that provides a seat at the base of the threaded end 32 against which an electrical lead 20 can be secured by a threaded nut 27. The stepped portion 33 can have a hexagonal shape as depicted. Alternatively, the stepped portion 33 can have a square shape, a rectangular shape, or any shape that will allow the pivot pin 21 to be held in a non-rotational manner by the side impact plate 26.

The side impact plate 26, depicted in FIG. 3, includes a central slot 34 that is configured to received the stepped portion 33 of the pivot pin 21. The width of central slot 34 should be nearly the same as the width of the stepped portion 33 of pivot pin 21 so that opposite edges of the stepped portion 33 engage the sides of central slot 34 and prevent the pivot pin 21 from rotating. Side impact plate 26 is secured to wall 24 of the yoke structure of the body 25 by means of threaded mechanical fasteners 35 which pass through slots 36, through-holes 37 in cover plate 30, and into internally threaded bores 38 in wall 24 of the yoke structure of the body 25. Slots 34 and 36 allow the position of side impact plate 26 to be adjusted relative to the front end of body 25.

As depicted in FIG. 3, the opposite end of pivot pin 21 is flat or similar to the ends of the pivot pin 3 depicted in FIG. 1. In the embodiment of the invention depicted in FIG. 3, the side of the parts gripper which is opposite to the side to which the electrical lead 20 is to be connected includes a side impact plate 18, similar to that depicted in FIG. 1, i.e., a side impact plate 18 that does not include central slot 34 shown in FIG. 3.

It is noted that, according to an alternative embodiment of the present invention, both ends of the pivot pin 21 can be configured to have stepped portions 33 and threaded portions 32, and both side impact plates can include central slots 34 so as to provide connections for electrical leads on both sides of the parts gripper. Such a dual continuity configuration would provide a back-up connection in case one lead would break or otherwise fail.

Figure 4:
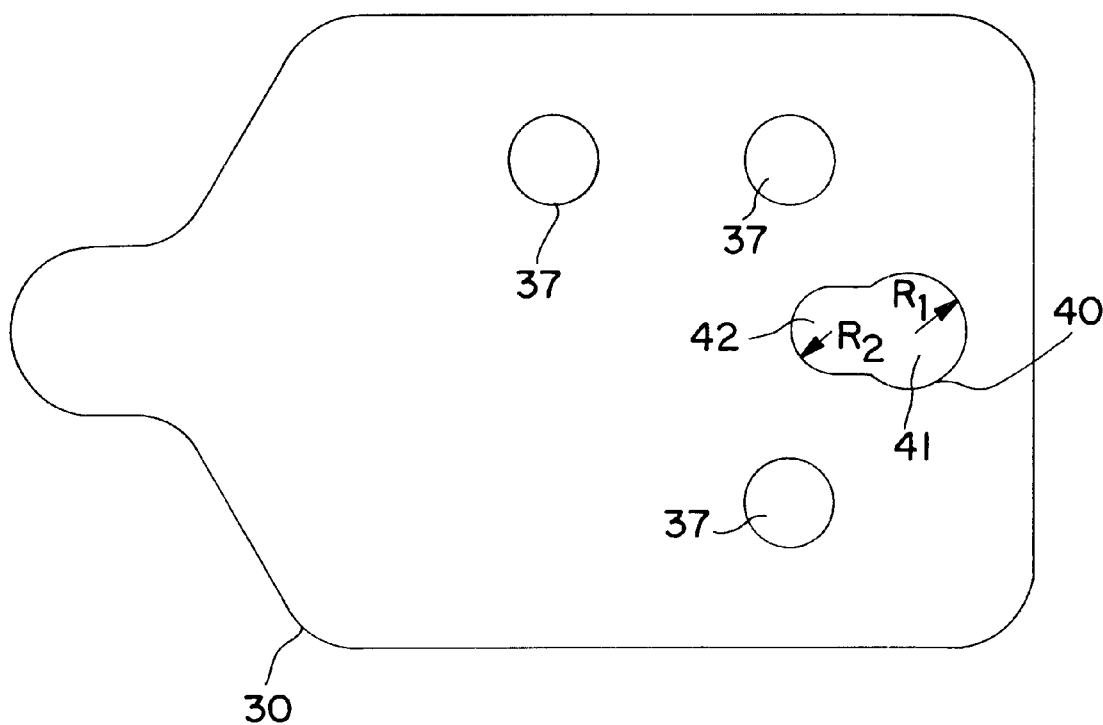
FIG. 4 is a side view of a cover plate according to one embodiment of the present invention.

FIG. 4 is a side view of the cover plate 30, according to one embodiment of the present invention. The cover plate 30 is a substantially flat planar member that includes through-holes 37 which are configured to be aligned with internally threaded bores 38 in wall 24 of the yoke structure of the body 25. The cover plate 30 also includes a keyed through-hole 40 for receiving the pivot pin 21 therethrough. The keyed through-hole 40 includes a first portion 41 having a radius $R_1$ and a second portion 42 having a smaller radius $R_2$, which is offset from the first portion 42. The radius $R_1$ of the first portion 41 is slightly larger than the diameter of the main portion 44 of pivot pin 21 (see FIG. 5). The radius $R_2$ of the second portion 42 is smaller than the diameter of the main portion 44 of pivot pin 21, and slightly larger than a neck portion 45 of the pivot pin 21 (see FIG. 5), which has a length that is slightly larger than the thickness of the cover plate 30. This configuration of the keyed through-hole 40 allows the main portion 44 of pivot pin 21 to pass through the first portion 41 of the keyed through-hole 40 until the neck portion 45 of the pivot pin 21 is positioned within the keyed through-hole 40. From this position, the cover plate 30 or the pivot pin 21 can be moved with respect to the other so that the neck portion 45 of the pivot pin 21 is positioned in the second portion 42 of the keyed though-hole. In this "locked" position, the pivot pin 21 cannot move along its axis with respect to the cover plate 30, because the cover plate 30 will be held between the stepped portion 33 and the larger diameter main portion 44 of the pivot pin 21.

Figure 5:
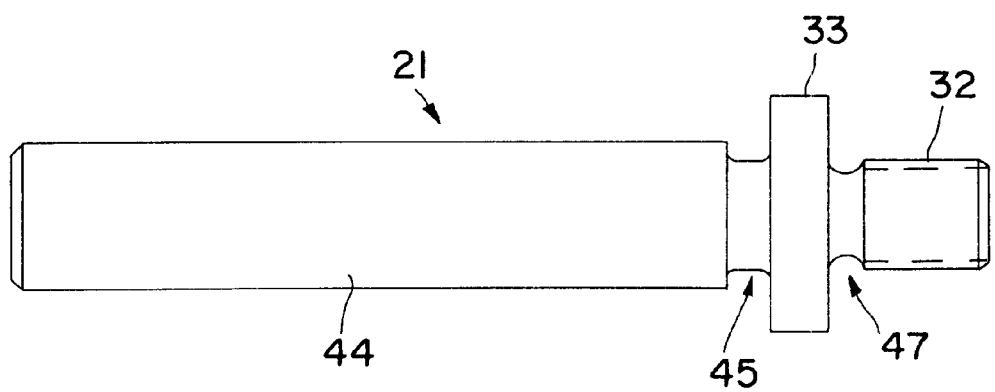
FIG. 5 is a side view of a pivot pin according to one embodiment of the present invention.

FIG. 5 is a side view of pivot pin 21, according to one embodiment of the present invention. The pivot pin 21 includes a main portion 44 which is cylindrical, the stepped portion 33 discussed above in reference to FIG. 3, a neck portion 45 which is located between the main portion 44 and the stepped portion 33, and a threaded end 32. As depicted, the threaded end 32 can be separated from the stepped portion 33 by a second neck portion 47. According to an alternative embodiment that is discussed above, both ends of the pivot pin 21 can be configured to include the neck portion 45, stepped portion 33, and threaded portion 32 depicted in FIG. 5.

Figure 6B:
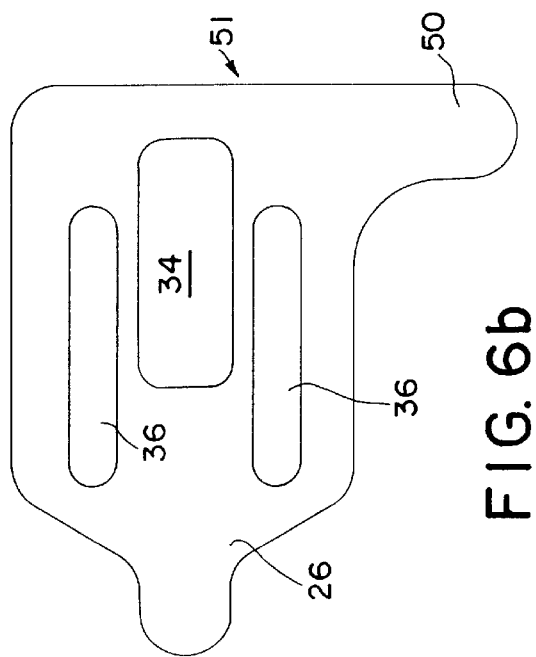
FIGS. 6a–6b are side views of side impact plates according to alternative embodiments of the present invention.
Figure 6C:
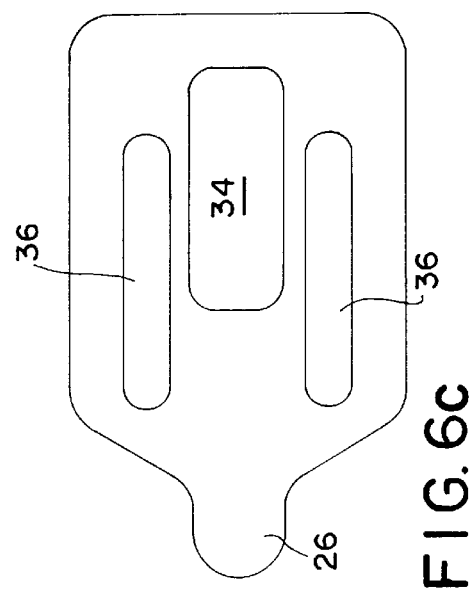
Figure 6A:
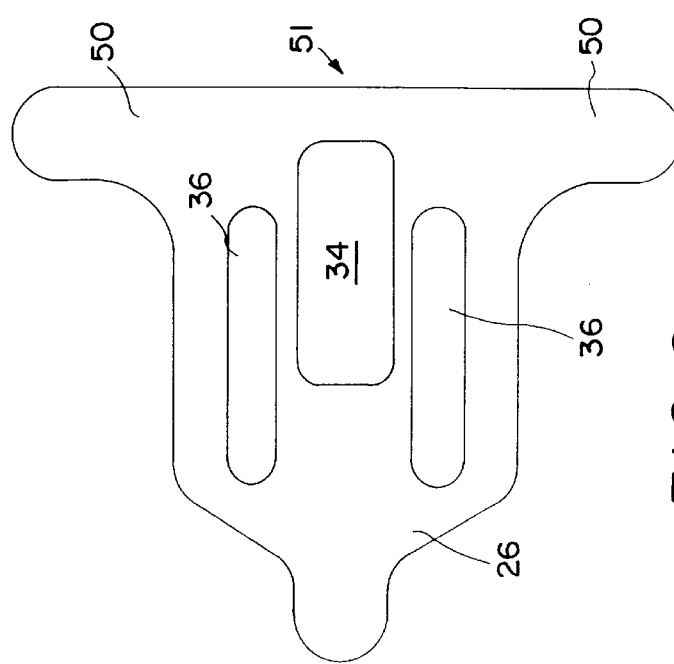

FIGS. 6a–6b are side views of side impact plates, according to alternative embodiments of the present invention. The side impact plates 26 are substantially flat planar members that include a pair of elongated slots 36 which are configured to be aligned with internally threaded bores 38 in wall 24 of the yoke structure of the body 25 so that the side impact plates 26 can be adjustably coupled to the wall 24 of the yoke structure of the body 25 by threaded fasteners 35, as indicated in FIG. 3. The side impact plates 26 also include a centrally located elongated slot 34 that is positioned between the pair of elongated slots 36. As discussed above, the centrally located elongated slots 34 are configured to receive the stepped portion 33 of pivot pin 21 therein.

FIG. 6a depicts a side impact plate that has a pair of legs 50 which extend in opposite sides, near end 51 of the side impact plate 26.

FIG. 6b depicts a side impact plate that has a single leg 50 which extends from one side, near end 51 of the side impact plate 26.

FIG. 6c depicts a side impact plate that does not have any of the leg structures depicted in FIGS. 6a and 6b.

The side impact plates 26 can be made out of a material such as hardened steel which is stronger that the body 25 of the parts gripper which can be made from a material such as hardened aluminum. The side impact plates 26 are coupled to the walls 24 of the yoke structure of the body 25 and positionally adjusted so as to extend beyond the front end of the body 25 of the parts gripper.

Referring to FIG. 3, the continuity switch assembly is assembled or installed on a parts gripper by inserting the pivot pin 21 through the first portion 41 of the keyed through-hole 40 of the cover plate 30 and into the pivot pin holes 31 (and through jaw members 23) on the walls 24 of the yoke structure of the body 25. The cover plate 30 is next slid within its plane so that the neck portion 45 of the pivot pin 21 is within the second portion 42 of the keyed through-hole 40. Next, the side impact plate 26 is positioned so that the central elongated slot 34 thereof receives the stepped portion 33 of the pivot pin 21, and the elongate slots 36 therein are aligned with the internally threaded bores 38 in the wall 24 of the yoke structure of body 25. Threaded fasteners 35 are then used to secure the side impact plate 26 to the body 25 of the parts gripper.

An end of an electrical lead 20 is then placed on the threaded end 32 of the pivot pin 21 and secured in position by threaded nut 27 or a similar fastener.

The continuity switch assembly of the present invention provides a means to couple an electrical lead to an element of a parts gripper which does not move with respect to the body thereof, and which is in direct contact with the jaw members of the parts gripper.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as described herein.

What is claimed is:

1. A parts gripper comprising:
    a gripper body having a yoke;
    a pair of jaw members;
    a pivot pin having a shaft conductively connected to the jaw members and connecting the jaw members to the yoke of the gripper body; and
    an electrical lead conductively connected to the pivot pin.

2. The parts gripper of claim 1, wherein the pivot pin includes a neck portion having a radius smaller than the radius of the shaft.

3. The parts gripper of claim 2, further including a cover plate, the cover plate having a keyed through-hole for mating with the neck of the pivot pin.

4. The parts gripper of claim 3, wherein the keyed through-hole includes a first portion with a first radius and a second portion with a second radius, the first radius greater than the radius of the shaft and the second radius greater than the radius of the neck portion and less than the radius of the shaft portion.

5. The parts gripper of claim 1, wherein the pivot pin includes a stepped portion with a width greater than the width of the shaft.

6. The parts gripper of claim 5, further comprising a side impact plate having a slot for mating with the stepped portion of the pivot pin to prevent the pivot pin from rotating.

7. The parts gripper of claim 6, wherein the width of the stepped portion of the pivot pin is approximately equal to the width of the slot of the side impact plate.

8. The parts gripper of claim 1, wherein the pivot pin includes an attachment portion for connecting the electronic lead.

9. The parts gripper of claim 8, wherein the attachment portion of the pivot pin is threaded and includes a threaded nut to connect the electrical lead thereon.

10. A parts gripper comprising:
    a parts gripper body having a yoke;
    a pair of jaw members;
    a pivot pin conductively connected to the jaw members and connecting the jaw members to the yoke of the gripper body, the pivot pin includes a shaft, a neck portion, a stepped portion, and a first attachment portion, the shaft connects the jaw members to the yoke;
    a cover plate having a keyed through-hole for mating with the neck portion of the pivot pin;
    a side impact plate having a slot for mating with the stepped portion of the pivot pin to prevent the pivot pin from rotating; and
    an electrical lead conductively connected to the first attachment portion of the pivot pin.

11. The parts gripper of claim 10, wherein the keyed through-hole includes a first portion with a first radius and a second portion with a second radius, the first radius being greater than the second radius.

12. The parts gripper of claim 10, wherein the neck portion of the pivot pin has a radius smaller than the radius of the shaft of the pivot pin.

13. The parts gripper of claim 10, wherein the width of the stepped portion of the pivot pin is approximately equal to the width of the slot of the side impact plate.

14. The parts gripper of claim 10, wherein the stepped portion of the pivot pin includes at least one flat side.

15. The parts gripper of claim 10, wherein the side impact plate includes at least one leg.

16. The parts gripper of claim 10, wherein the pivot pin includes a second attachment portion disposed opposite the first attachment portion.

17. The parts gripper of claim 10, wherein the first attachment portion is threaded and includes a threaded nut to connect the electrical lead thereon.

18. A work station for positioning a workpiece, comprising:
    a pair of parts grippers, each of the parts gripper having a pair of jaw members for grabbing the workpiece and a pivot pin having a shaft conductively connected to the jaw members;
    a continuity detector having a pair of inputs for determining the presence of the workpiece between the jaw members of the parts grippers;
    a first electrical lead connecting the pivot pin of one of the parts grippers to one of the inputs of the continuity detector; and
    a second electrical lead connecting the pivot pin of the other parts gripper to the other input of the continuity detector.

19. The work station of claim 18, wherein each pivot pin includes a neck portion, a stepped portion, and an attachment portion, the radius of the neck portion is less than the radius of the neck portion, and the width of the stepped portion is greater than the width of the shaft.

20. The work station of claim 19, wherein each parts gripper includes a cover plate and a side impact plate, the cover plate includes a keyed through-hole that mates with the neck portion of the pivot pin, and the side impact plate includes a slot that mates with the stepped portion of the pivot pin.

* * * * *